US012070766B2

(12) United States Patent
Raset Papiol

(10) Patent No.: US 12,070,766 B2
(45) Date of Patent: Aug. 27, 2024

(54) MULTICOMPONENT SPRAY GUN AND SPRAY EQUIPMENT INCLUDING SAME

(71) Applicant: HI-TECH SPRAY EQUIPMENT, S.A., Sitges (ES)

(72) Inventor: Josep María Raset Papiol, Sitges (ES)

(73) Assignee: HI-TECH SPRAY EQUIPMENT, S.A., Sitges (ES)

(*) Notice: Subject to any disclaimer, the term of this patent is extended or adjusted under 35 U.S.C. 154(b) by 341 days.

(21) Appl. No.: 17/201,523

(22) Filed: Mar. 15, 2021

(65) Prior Publication Data

US 2021/0283626 A1 Sep. 16, 2021

(30) Foreign Application Priority Data

Mar. 16, 2020 (EP) .................................... 20382196

(51) Int. Cl.
*B05B 7/04* (2006.01)
*B05B 7/12* (2006.01)

(52) U.S. Cl.
CPC ............. *B05B 7/0408* (2013.01); *B05B 7/12* (2013.01)

(58) Field of Classification Search
CPC ............................... B05B 7/0408; B05B 7/12
USPC ........................................................ 239/407
See application file for complete search history.

(56) References Cited

U.S. PATENT DOCUMENTS

| | | | | |
|---|---|---|---|---|
| 4,453,670 | A * | 6/1984 | Sirovy | B29B 7/7438 239/117 |
| 4,545,288 | A * | 10/1985 | Burke | F15B 15/065 92/136 |
| 4,957,239 | A * | 9/1990 | Tempelman | B65D 83/7535 222/149 |
| 5,829,679 | A * | 11/1998 | Strong | B29B 7/7678 239/117 |
| 6,883,735 | B2 * | 4/2005 | Ganzer | B05B 15/5225 239/106 |
| 8,931,715 | B2 | 1/2015 | Courier | |

FOREIGN PATENT DOCUMENTS

WO 2004/037429 A2 5/2004

OTHER PUBLICATIONS

European Search Report for European Patent Application No. 20382196; European Patent Office; Munich, Germany; Jul. 8, 2020.

* cited by examiner

*Primary Examiner* — Chee-Chong Lee
(74) *Attorney, Agent, or Firm* — Thomas E. Lees, LLC

(57) ABSTRACT

The present invention relates to a spray gun of those that mix at least two pressurised components in an internal mixing chamber of said gun for subsequent pulverisation/projection to the outside through the dispenser, wherein the gun has a configuration that allows a frontal removal of the mixing chamber directly without disassembling the parts that surround same. The present invention also relates to a spray equipment for the mix with the aforementioned gun.

13 Claims, 6 Drawing Sheets

MULTICOMPONENT SPRAY GUN AND SPRAY EQUIPMENT INCLUDING SAME

CROSS-REFERENCE TO RELATED APPLICATIONS

This application claims the benefit of European Patent Application No. 20382196, filed on Mar. 16, 2020, the disclosure of which is hereby incorporated by reference.

The present invention relates to a spray gun of those mixing at least two components under pressure in an inner mixing chamber of said gun, to be subsequently dispensed to the exterior pulverised/projected through the diffuser of same.

The present invention also relates to a multicomponent spray equipment with the aforementioned gun.

BACKGROUND

Spray guns with a mixture of two components are well known. The operational principle of these guns involves the reception in the gun of two independent components at a specified pressure so that, after passing through the corresponding gun inlet filters, both components are directed to the mixing chamber of the gun.

Leaving aside low-pressure application guns, which do not need a head structure for containing pressurised elements nor a coupling block for the component inlets, the operation pressures of projection guns are generally above 30-40 bar, requiring the coupling block for the pressurised components supplied by the device. These spray guns with working pressures above 30-40 bar, and often with working pressures above 200 bar, require a head structure that prevents the outlet of the mobile elements, containing these elements inside same, such as the mixing chamber, and preventing their displacement beyond the displacement stop points.

When the gun user actuates the trigger, the two components are introduced in the mixing chamber and led to the exterior by the diffuser.

In the normal use of this type of guns, where the components are mixed to obtain a final projected product that reacts to allow producing foams projected on surfaces, it is essential to clean the parts of the gun that have been in contact with the mixture of the components, such as the diffuser and the mixing chamber. It should also be noted that cleaning of these parts is also important even if there is not reaction in the mixture of the two components, merely in order to prevent incrustations.

The mixing chamber is a mobile inner piece associated with the actuation of the trigger and with a specific assembly position to communicate the mixing space and the inlets of the components to be mixed. A thorough cleaning of the mixing chamber requires removing same from its location, and therefore the disassembly thereof, which is complex due to the many parts that need to be removed to access it and the resulting problem of subsequent assembly for later use.

There are spray guns in the market, which therefore form part of the prior art, that mix two components inside them and which allow the quick disassembly of some of their parts, such as the head, by grouping several pieces therein such as the diffuser, filters, friction bushings, mixing chamber, etc. for exchange with another head.

Although the aforementioned solution allows performing this exchange of parts, known solutions do not allow a simple and quick extraction of the mixing chamber without having to remove additional parts, which is one of the gun elements that especially require correct cleaning after mixing the two components.

Also known in the state of art are component spray equipment that use the aforementioned types of spray guns to perform pulverisation/projection tasks for the mix of components supplied. The productivity of these devices can be affected by the down times involved in cleaning the parts that have housed the mixture of said components, which can change state and obstruct or hinder the operation of the device.

BRIEF SUMMARY

The aim of the present invention is to provide a multicomponent spray gun and to provide a spray equipment that includes the gun, that allows solving the aforementioned drawbacks as well as providing other advantages as described below.

The present description uses a terminology for referencing objects, displacements or operating positions which, when the reference system changes, must be adapted and modified accordingly, as the essence of the invention remains the same.

Similarly, the reference to the action of the gun with respect to the spray must be understood as being analogous to the functions of projection, pulverisation or mere dispensation under pressure of the components.

It should also be considered that when a longitudinal displacement or adjacent longitudinal position are referred to, these must be understood as a displacement or an adjacent position along the axis of movement of the mixing chamber part, which coincides with the axis of the diffuser and the outlet of the mixed components.

In addition, for the sake of clarity, the operating position should be understood as the position in which all the parts are ready to proceed with the normal operation according to the configuration of the device.

According to the above, a first aspect of the present invention relates to a spray gun of those having at least two component inlets for mixing same in an internal piece of the gun which is a mixing chamber. In the operating position of the gun the mixing chamber piece comprises an area adapted so that it can be retained and held by a retaining element that can be operated from outside the gun with an actuation element.

An additional feature of the invention is that the actuation element has a position in which it locks the position of the retaining element in the retaining position and a release position in which it allows a longitudinal displacement of the mixing chamber piece towards the diffuser of the gun.

This advantageous configuration allows obtaining a gun wherein, without disassembling parts that surround the mixing chamber part, the mixing chamber part can be extracted frontally by the diffuser area without having to disassemble the head, releasing said mixing chamber part with the actuator.

This allows cleaning or changing the mixing chamber in a quick manner without requiring complex disassembly, subsequently also requiring a complex reassembly which may eventually lead to an incorrect assembly.

As the mixing chamber part is usually joined to the diffuser such that said mixing chamber part can be extracted by the front part thereof, in this typical case the diffuser must be extracted prior to the extraction of the mixing chamber part. Analogously, as the friction bushings press against the walls of the mixing chamber part the extraction thereof can be difficult, so that contact pressure is relieved previously, at least in part.

According to a preferred embodiment of the invention, the mixing chamber piece has a longitudinal displacement element which, either automatically or by the user's action, displaces the mixing chamber part along the longitudinal axis in the extraction direction, once the actuating element is in its release position.

This feature allows the chamber to be extracted towards is front external position even more easily, facilitating the manipulation and extraction thereof by the user.

Optionally and preferably, in its operating position the mixing chamber piece presses against a spring placed between the mixing chamber piece and the adjacent internal piece in the longitudinal direction, while when the retaining action of the mixing chamber piece is released, the spring acts as a longitudinal displacement element, pushing the mixing chamber piece automatically towards the outside.

With this possible automatic ejection system, the extraction can be performed almost automatically once the retaining element is released.

Preferably, in the longitudinal path of the mixing chamber piece to the diffuser or the external front part of the gun, the gun does not have any element that prevents passage of the mixing chamber piece except for the diffuser itself, which is independently removable, and the possible pressure exerted by the friction bushings.

In this way, direct frontal extraction is possible without disassembling the head or any additional disassembly of any parts of the head which, in the configuration of the gun, could be interposed in the extraction path of the mixing chamber piece. As indicated, the diffuser assembly and disassembly is external and independent of all the other pieces of the gun head, which in no way makes more complex the aforementioned process. Even in cases in which the diffuser is screwed onto the external expulsion part of the mixing chamber, the extraction of the mixing chamber piece is performed together with the diffuser with no additional action.

In a preferred embodiment of the invention the retaining element is a ball-securing piece that fits in the groove formed by the retaining area, where the longitudinal movement of the ball-securing piece allows locking and releasing the retention in the groove of the retaining area, and where the longitudinal movement for releasing said securing piece is performed by the actuation element.

The presence of a retaining element that uses balls as the retaining element and which enter the groove in the retaining area of the mixing chamber piece means that there is no need for an initial orientation in the assembly. The position of the element containing the balls in the locked position and, therefore, operating position, is that associated with the external actuator controlled by the user and which allows moving said actuator, provides a greater space for the balls and allows the balls to exit the groove of the mixing chamber part.

Optionally and also preferably, the gun has a cartridge for each inlet of a component to mix in the mixing chamber piece, each cartridge having a friction bushing for said mixing chamber piece, where said cartridge has an external surface accessible to the user with gripping and manual attachment elements in the working position.

This advantageous configuration of the cartridges of the friction bushings, allows the user to loosen same easily and quickly, without requiring tools or additional disassembly, by pushing them back slightly. Said friction bushings are designed to be in contact with the mixing chamber piece and, for precaution reasons and to facilitate the automatic extraction of said mixing chamber piece, the contact pressure is released from the contact position with the wall that rub against the mixing chamber piece.

With regard to the mixing chamber piece optionally, although preferably, same has a bevelled area or an area with a ramp that increases in size in the direction opposite to the longitudinal introduction to the operating position, displacing any mobile element placed in the path of the assembly of the mixing chamber piece.

This feature of the shape of the mixing chamber piece simplifies the assembly operation thereof, so that if it has an element, such as the friction bushings, that invades part of its longitudinal path to the working and retention position thereof, this element can be slightly displaced to allow passage of the piece.

In a preferred embodiment of the invention, the gun has a removable head consisting at least of:

- a structural casing for retaining the elements that act in the head and are subjected to pressure and provides a housing for the mixing chamber piece;
- cartridges with friction bushings; and
- component inlet connections and/or coupling block, where said removable head disengages as a whole from the gun body and where the structural casing has a system for assembly and attachment to the gun body.

This embodiment allows dividing the two main components of the gun, the body and the head, either for a quick exchange or for cleaning by parts, as the head incorporates all the parts that are usually in contact with the mixing components or leave them visible for extraction thereof.

With regard to this removable head, the attachment system on the gun body preferably comprises an element for locking the working position of the removable head in the gun.

Having this locking element in the working position allows working with the certainty of not accidentally releasing the removable head assembly and attachment system.

In a preferred embodiment of the invention, the removable head has an assembly and attachment system to the body of the gun with a bayonet closure.

This assembly and attachment system allows during both assembly and removal to execute a simple rotational and longitudinal movement to attach or remove the head, provided the locking system is in a position that allows this.

As an alternative embodiment of the locking element, the locking element is preferably based on an element that secures the position of the head, preventing the rotation and longitudinal displacement of the head and therefore preventing the removal thereof. Preferably, the position is secured by a pin provided at one of the two main parts, body and head, that is inserted retractably in a housing of the other main part.

Optionally, the head has a cartridge with a filter and an anti-return system associated to each of the component inlets to the gun. This arrangement of the cartridge with a filter and antireturn system allows, in addition to filtering particles, that no product drips from the head and that the products cannot enter in contact inside same when the head is removed.

This cartridge with a filter and antireturn system preferably has a direct access to same from the outside for the user, with a removable closure that attaches same to the cartridge array. This actuation advantageously allows changing the filter without removing any additional part of the gun.

Also, optionally, the union and assembly elements of at least the external access pieces of the gun, whether they form part of the gun or the head, are of the same type and size.

This allows using the same tightening or loosening tool to remove the elements that join many of the pieces of the gun that allow cleaning same, reducing the number of tools that the user needs for the conventional use of the gun.

Also, optionally, the head or coupling block, removable or not, has multiple inlet connections as well as those used for entry of components, which are removably plugged for possible use.

This allows establishing different orientations in the inlet connection of the components to mix in the gun.

Also according to the aim of the invention and according to a second aspect thereof, the present invention is also based on a spray equipment of pressurised components, of those that use a system for storing and pumping the components to the gun, where the equipment comprises at least one spray gun as that indicated in the preceding features, corresponding to the first aspect of the invention.

This allows having a device in the form of a spray equipment of multicomponents in which after use the mixing chamber piece thereof can be cleaned or exchanged in a quick and simple manner without disassembling any additional parts.

BRIEF DESCRIPTION OF THE SEVERAL VIEWS OF THE DRAWINGS

For the better understanding of the description made herein, a set of drawings has been provided wherein, schematically and solely by way of a non-limiting example, a practical case of an embodiment is portrayed.

DETAILED DESCRIPTION

Figure 1:
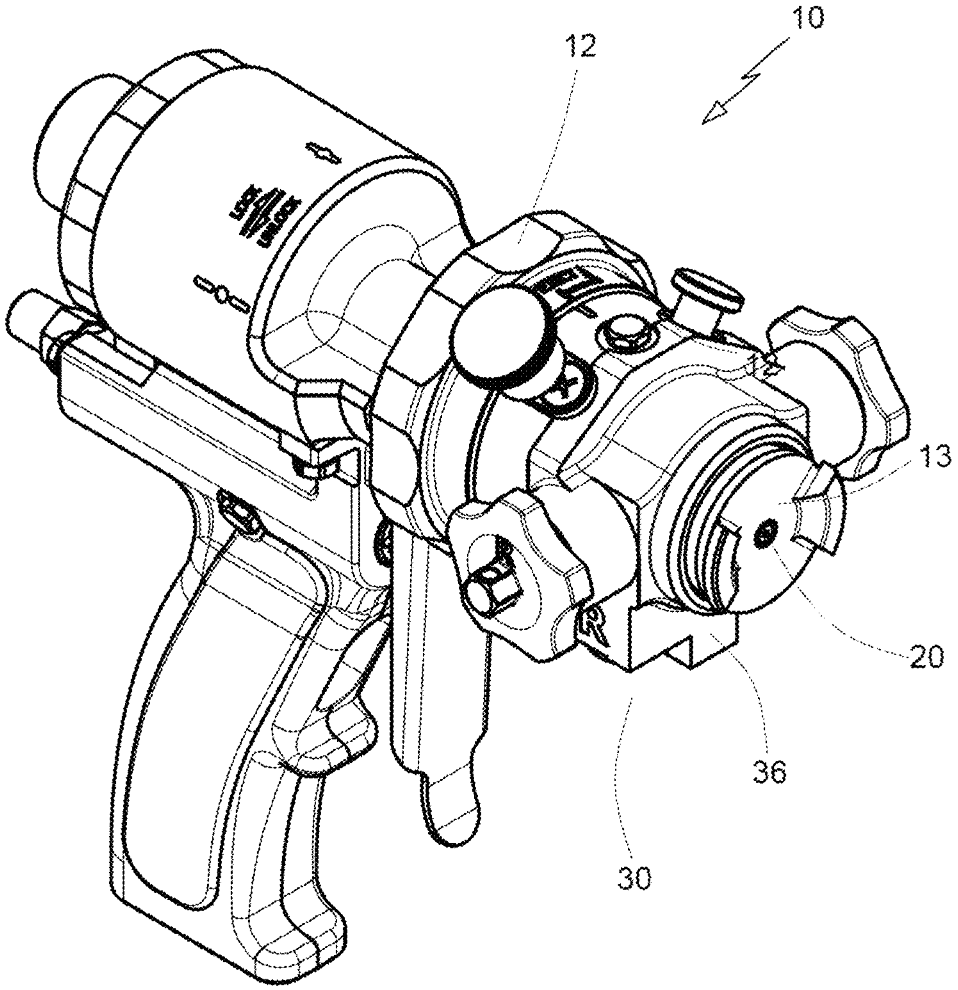
FIG. 1 is a perspective view of the spray gun in its working position.
Figure 2:
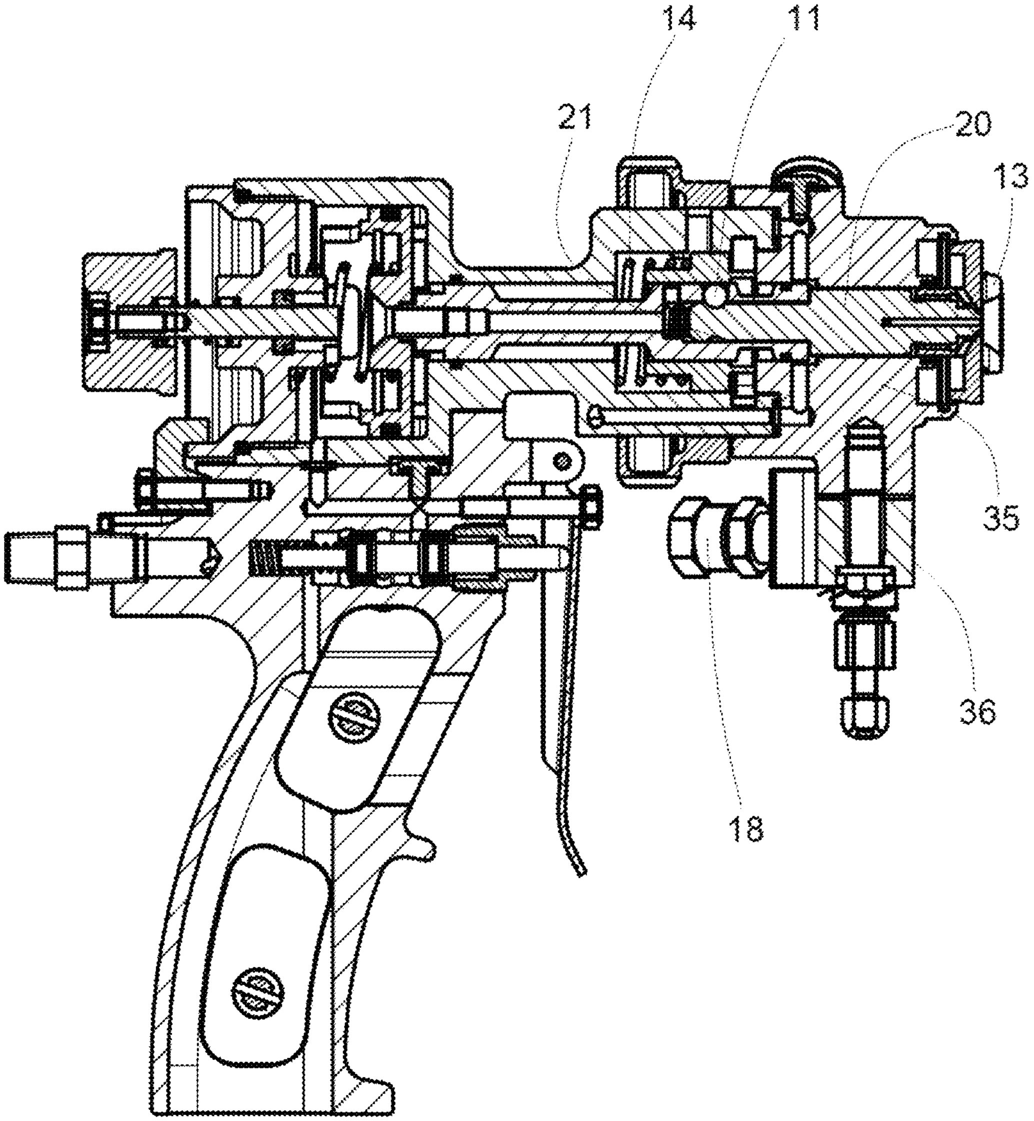
FIG. 2 is a side elevation cross-sectional view of the spray gun in its working position.
Figure 3:
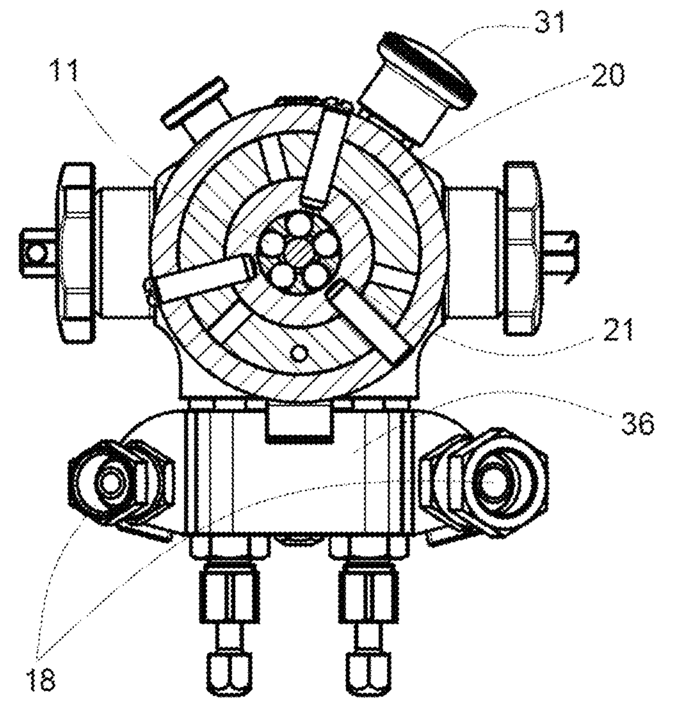
FIG. 3 is a front elevation cross-sectional view along the retaining element of the spray gun in its working position.

Various embodiments of the spray gun for mixing components of the invention as well as the supply and projection/pulverisation equipment that it comprises are described below, with reference to the figures described above.

According to a preferred embodiment, as can be seen in FIGS. 1 to 3 and 5, the invention relates to a spray gun (10) used in a spray equipment (200) for projection of a mixture of two components, which when mixed and projected change their physical state. These components are supplied by a storage system (201) and pumped under pressure by a pumping system (202) to the gun (10).

The spray gun (10) works such that the components to mix enter under pressure at each of the inlets (18) arranged at the coupling block (36) so that, after each component passes through the corresponding cartridge (40) with a filter (41), when the user presses the trigger of the gun (10) said components enter the mixing chamber piece through the cartridges (15) with friction bushings (16), and the mixture exits through the opening of the mixing chamber piece (20) and through the diffuser (13). The coupling block (36), as well as the inlets (18), can alternatively have multiple inlet connections that are plugged.

In its working position the mixing chamber piece (20) moves in the housing of the structural casing (35) of the head (30), the displacement thereof being limited in the longitudinal sense by a retaining element (11) which prevents longitudinal displacement beyond a desired point, holding an area (21) adapted for retention.

This retaining element (11) is formed by a ball securing piece which, in said working position, is inserted in the groove formed by the retaining area (21). To release the mixing chamber piece (20) an actuation element (12) is provided in communication with the part that retains the balls in the position pressing against the groove of the retaining area (21). When this actuation element (12) is released and moves in a longitudinal sense it moves the part that retains the balls, allowing a retracted position of the balls with respect to the groove of the retaining area (21).

This end of the retention of the mixing chamber piece (20) must be preceded by a pressure release in the gun and a release of pressure on the cartridges (15) that contain the friction bushings (16), as well as the release of the attachment position of the diffuser (13).

With these previous safety actions and once the mixing chamber piece (20) is released by the user with the actuation element (12), the mixing chamber piece (20) is pushed slightly outwards along the longitudinal axis by a spring (14).

As the structural casing (35) has a configuration of the housing of the mixing chamber piece (20) that allows the free displacement of its entire geometry to the outside, the force exerted by the spring (14) means that the chamber part is exposed on the outside in the area of the diffuser (13), and can be removed from the gun (10) without disassembling any main piece.

Figure 7:
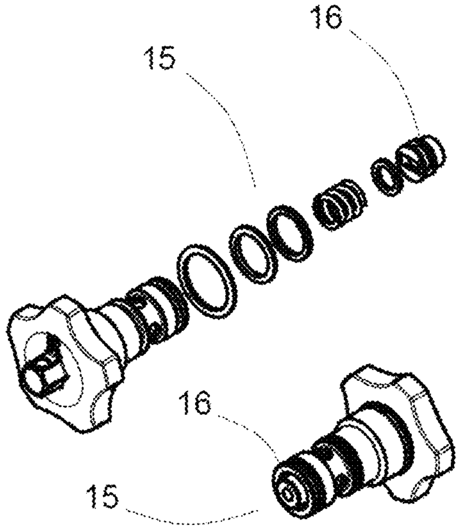
FIG. 7 is an exploded view of the cartridge with the friction bushings.

In the present embodiment the previous release action of the pressure exerted by the friction bushing (16) is performed by the actuation on the cartridge (15) that contains this friction bushing (16), as it has an external gripping surface as can be seen in FIG. 7, where a screwing action allows releasing the pressure exerted by the friction bushing (16) against the mixing chamber piece (20).

To simplify the reinsertion of the mixing chamber piece (20) in the gun (10), said mixing chamber piece (20) has a bevelled surface (17) in its larger area with respect to the housing. Due to its shape this bevelled surface (17), when it meets an element placed in its path, such as the friction bushings (16), will move them towards the inside of their housing and thus allows inserting the mixing chamber piece (20) in its working position. In this position, if the actuator (12) is returned to its locking position the balls of the retaining element (11) will again enter the retaining area (21).

Figure 4:
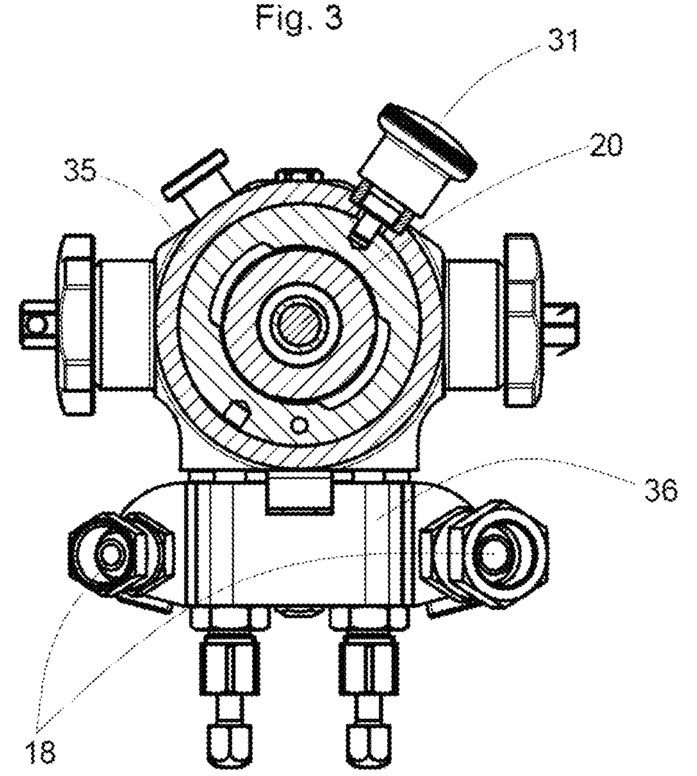
FIG. 4 is a front elevation cross-sectional view along the locking knob of the removable head of the spray gun in its working position.
Figure 5:
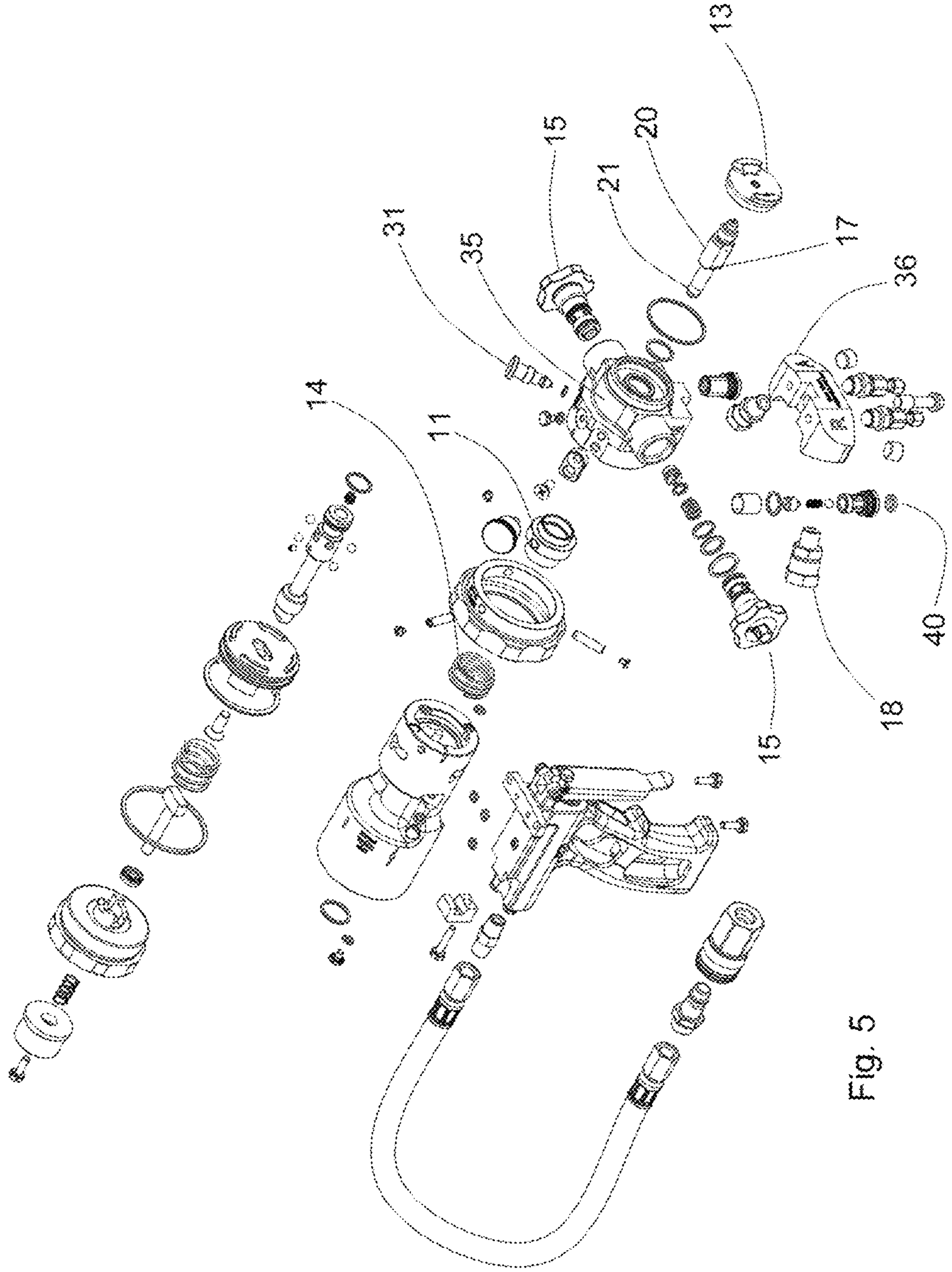
FIG. 5 is an exploded view of the spray gun.
Figure 6:
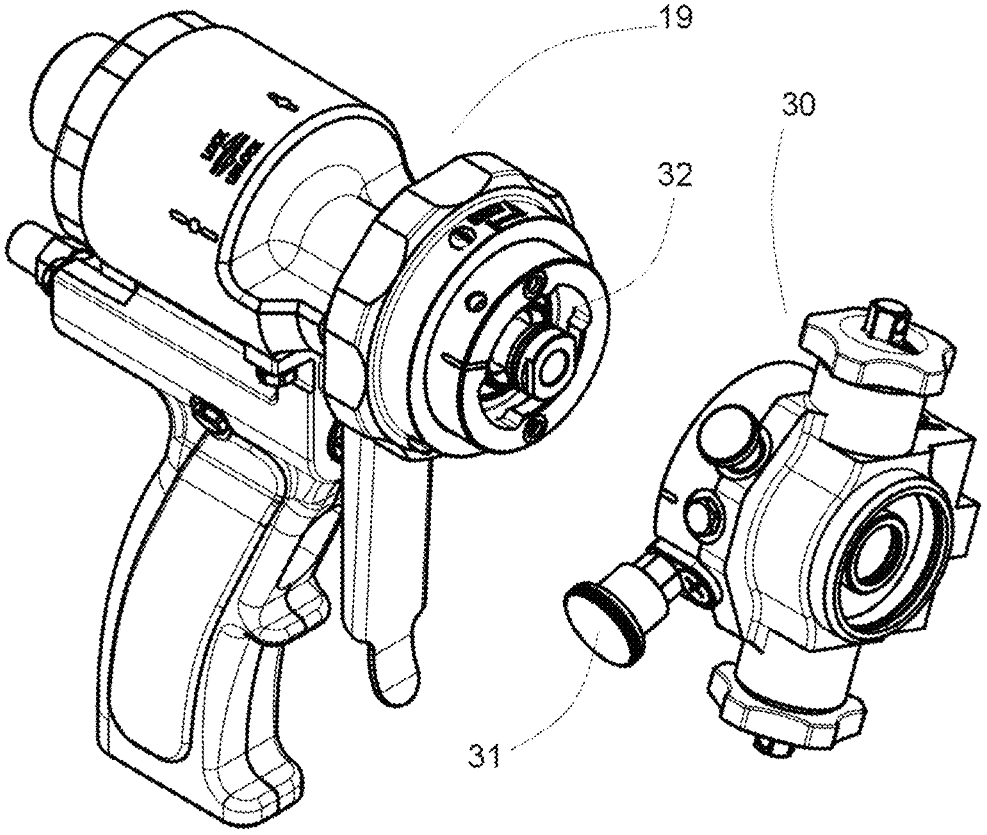
FIG. 6 is a perspective view of the gun with the head rotated and removed.
Figure 8:
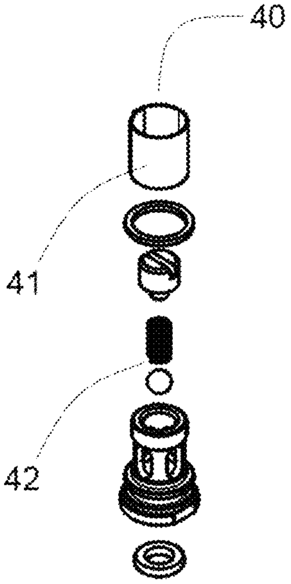
FIG. 8 is an exploded view of the cartridge with a filter and anti-return system.
Figure 9:
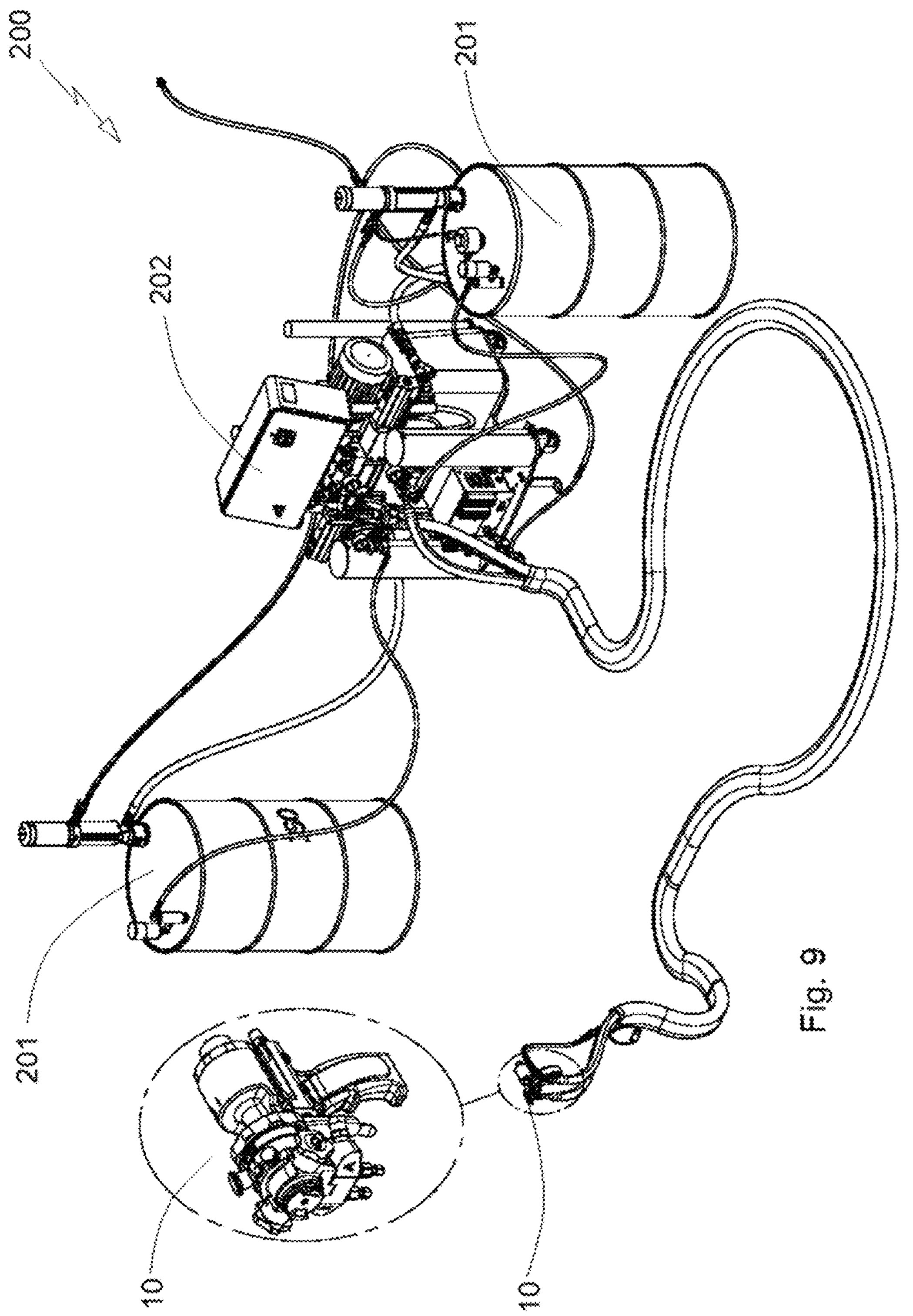
FIG. 9 is a perspective view of the supply, pulverisation/projection equipment with the gun connected.

The gun (10) can be divided into two main pieces, a removable head (30) and a gun body (19), where the head (30) can be separated from said body (19), as can be seen in FIGS. 4 and 6. The head (30) comprises:

a structural casing (35) that contains all the elements thereof, fixing the position thereof with its metallic structure and comprising a housing for placing and displacing the mixing chamber (20);

the cartridges (15) with the friction bushings (16); and a coupling block (36) that includes the inlet connections (18) of each component and which contain the corresponding cartridges (40) with a filter (41) accessible from the outside, which alternatively can have an antireturn system (42) as can be seen in FIG. 8.

The removable head (30) has an assembly and attachment system (32) in the body (19) of the gun (10), comprising in the present embodiment a bayonet type closure system that is locked in the working position by a locking element (31).

The external access parts such as the various parts of the body (19) of the gun (10) or the head and the coupling block (36) have attachment screws that can be removed with a single tool as the coupling system for said screws is of the same type and shape.

Although reference has been made to a specific embodiment of the invention, it is clear to a person skilled in the art that the spray gun and the spray equipment including the gun described are susceptible to numerous variations and modifications, and that all the details mentioned can be replaced by other technically equivalent ones, without departing from the scope of protection defined by the attached claims.

What is claimed is:

1. A spray gun with at least two inlets for components to be mixed in an internal piece of the gun which is a mixing chamber piece, where the mixing chamber piece is contained in a head of the spray gun, where the head incorporates all parts that are in contact with the components to be mixed and the head is coupled to a body of the spray gun, the spray gun characterized in that in an operating position the mixing chamber piece comprises an area adapted for retention that is held by a retaining element which can be operated from outside the gun with an actuation element, wherein the actuation element has a position in which it locks a position of the retaining element in a retaining position and a release position that allows a direct frontal extraction longitudinal displacement of the mixing chamber piece to a diffuser area or to an external front part of the gun, wherein the mixing chamber piece can be extracted from the head of the spray gun frontally by the diffuser area without having to disassemble the head, with all parts that are in contact with the components to be mixed, from the body of the spray gun, releasing said mixing chamber piece with an actuator; and wherein the gun, in the direct frontal extraction longitudinal displacement of the mixing chamber piece to the diffuser area or to an external front part of the gun, the gun does not have any element that prevents passage of the mixing chamber piece except for a diffuser itself, wherein the diffuser is independently removable, and except for a possible pressure exerted by friction bushings on the mixing chamber piece, having the head coupled to the body of the spray gun.

2. The spray gun according to claim 1 wherein the mixing chamber piece has a longitudinal displacement element which, either automatically or by a user's action, displaces the mixing chamber piece along a longitudinal axis in an extraction direction, once the actuating element is in its release position.

3. The spray gun according to claim 2 wherein, in the operating position of the mixing chamber piece, the mixing chamber piece presses against a spring placed between the mixing chamber piece and an adjacent internal piece in the longitudinal direction, while when a retaining action of the mixing chamber piece is released, the spring acts as a longitudinal displacement element, pressing the mixing chamber piece automatically towards the outside.

4. The spray gun according to claim 1 wherein the retaining element is a ball-securing piece that fits in a groove formed by a retaining area, where a longitudinal movement of the ball-securing piece allows locking and releasing the retaining position in the groove of the retaining area, and where the longitudinal movement for releasing said ball-securing piece is performed by the actuation element.

5. The spray gun according to claim 1 wherein the gun has a cartridge for each inlet of a component to mix in the mixing chamber piece, each cartridge having a friction bushing for said mixing chamber piece, and where said cartridge has an external surface accessible to a user with gripping and manual attachment elements in the working position.

6. The spray gun according to claim 1, wherein the mixing chamber piece has a beveled area or an area with a ramp that increases in size in a direction opposite to the longitudinal introduction to the operating position.

7. The spray gun according to claim 1, wherein the head is removable from the body of the spray gun head comprising at least:

a structural casing for retaining all parts that are in contact with the components to be mixed that act in the removable head and are subjected to pressure and which houses the mixing chamber piece;

cartridges with friction bushings; and component inlet connections and/or coupling block, where the head disengages as an array from the body of the spray gun and wherein the structural casing has a system for assembly and attachment to the body of the spray gun.

8. The spray gun according to claim 7, wherein the head has a locking element for the working position of the removable head in the gun.

9. The spray gun according to claim 7, wherein the system for assembly and attachment of the head to the body of the gun has a bayonet closure.

10. The spray gun according to claim 7 wherein, associated to each of the at least two inlets for components to the gun, the head has a cartridge with a filter and an anti-return system.

11. The spray gun according to claim 10, wherein the cartridge and the anti-return system provides direct access from the outside for the user by means of a removable closure that holds the cartridge.

12. The spray gun according to claim 1 wherein the removable head has multiple inlet connections in addition to the at least two inlets for components, where the multiple inlet connections are removably plugged for potential use thereof.

13. A spray equipment of pressurized components that uses a storage system and a pumping system of components to be mixed, characterized in that the spray equipment comprises at least one spray gun as that indicated in claim 1.

* * * * *